(12) United States Patent
Lee (10) Patent No.: US 6,222,799 B1
(45) Date of Patent: Apr. 24, 2001

(54) HIGH-PERFORMANCE INFORMATION PROCESSING APPARATUS HAVING MULTITASKING FUNCTIONS

(75) Inventor: Howard Hong-Dough Lee, Bloomfield, MI (US)

(73) Assignee: Intellectual Science and Technology Inc., Bloomfield, MI (US)

( * ) Notice: Subject to any disclaimer, the term of this patent is extended or adjusted under 35 U.S.C. 154(b) by 0 days.

(21) Appl. No.: 09/513,985

(22) Filed: Feb. 26, 2000

Related U.S. Application Data (62) Division of application No. 08/850,844, filed on May 2, 1997, now abandoned.

(51) Int. Cl.[7] ...................................................... G11B 7/22
(52) U.S. Cl. ................................................ 369/34; 369/36
(58) Field of Search ...................................... 369/30, 33, 34, 369/32, 58, 36

(56) References Cited

U.S. PATENT DOCUMENTS

| | | | |
|---|---|---|---|
| 5,574,881 | * 11/1996 | Yasuoka et al. | 369/34 |
| 5,631,893 | * 5/1997 | Kang et al. | 369/34 |
| 5,666,334 | * 9/1997 | Tokuyama et al. | 369/34 |
| 5,734,631 | * 3/1998 | Ikedo et al. | 369/34 |

* cited by examiner

*Primary Examiner*—Nabil Hindi
(74) *Attorney, Agent, or Firm*—Hartman and Hartman, P.C.

(57) ABSTRACT

An information processing apparatus having hardware components that include plural turntables, plural head units, plural decoding units, at least one encoding unit, and a system control unit. These components are adapted in such a manner as to afford (1) true multitasking in information reading and writing, (2) direct communication for information to be exchanged directly within the information processing apparatus, (3) disc removability for information to be stored as off-line archives and to become transportable between computer systems, (4) separation of user-created data from program files for eliminating time-consuming file-defragmentation processing and for conveniently safe-keeping the user-created data, and (5) capability of launching favored software programs directly from original software discs. In essence, the apparatus provides multiple and highly-improved functions of secondary and tertiary storage that cannot be obtained from any combinations of conventional hard-disk, floppy-disk, optical-disc, and backup drives.

15 Claims, 10 Drawing Sheets

HIGH-PERFORMANCE INFORMATION PROCESSING APPARATUS HAVING MULTITASKING FUNCTIONS

This application is a divisional of application Ser. No. 08/850,844 filed May 2, 1997 now abandoned.

FIELD OF THE INVENTION

The present invention relates generally to the field of an information processing apparatus using optical disc media for providing and storing information and more particularly to a high-performance information processing apparatus having multiple and highly-improved functions of secondary and tertiary storage for improving the efficiency of a host computer in performing information processing.

BACKGROUND OF THE INVENTION

It is nowadays essential that a computer system be equipped with a hard-disk drive, a floppy-disk drive, a read-only-memory compact-disc (CD-ROM) drive, and a backup drive either a tape backup drive or a removable-disk drive. Each of these drives had been evolved for taking part in providing some of the multiple functions of secondary and tertiary storage necessary for the computer system to become fully operable in preforming information processing.

The function of a hard-disk drive is known to supply on-line information to the microprocessor of a computer system; while, a floppy-disk drive allows a user to install software onto the hard-disk drive and to transport data between computers. This has been the basis for the evolution of conventional computer systems; and, the proceeding of information processing has thus been heavily dependent on the read/write operation of the hard-disk drive. The immediate disadvantage has been that each newly-purchased software program has to go through a tedious, time-consuming installation process through which program files are (decompressedly) copied to the hard-disk drive from which the software program is then launched. This remains in effect regardless of whether software is distributed through optical-disc or floppy-disk media. Aside from the direct cost paid for software, an end user is also incurred with indirect cost for having corresponding hard-disk space for storing the purchased software program.

When a software program is distributed through floppy-disk media, an end user is advised to make a set of backup copies because floppy diskettes are susceptible not only to physical and external damages but to magnetic degradation. Inevitably encountered are other disadvantages: requiring a time-consuming backup process and leaving no room for the software program to be copyright protected.

The practice of installing a purchased software program from purchased software diskettes to a hard-disk drive does not leave much room for software to be copy-right protected. There exist hardware-type protection devices; but, they are affordable only for high-price software programs with an aim of selling at most a few thousand copies for use in trading stocks or futures in real time, for instance. In contrast, volume software programs are sold in sealed envelopes. Once a sealed envelope of a software program is opened, an end user is assumed to accept the software license agreement set by a software developer; and, the software program is not returnable. Unfortunately, there is no practical way to prevent the volume software program from being illegally copied or duplicated. As with the software developers producing high-volume and low-price software programs suffer from their products being illegally copied, the end users lose their opportunity to thoroughly try out a software program before purchasing.

The conventional practice eventually degrades the read/write efficiency of a hard-disk drive. This is because user-created and software-created data files mixedly stored with program files on the hard-disk drive are constantly rewritten, fragmentally relocated, and eventually scattered all over the hard-disk drive. Accordingly, a longer time is needed to find all of the fragmentally-stored data of a large user-created data file. The only remedy currently available for this problem is to routinely run a file-defragmentation process. Unfortunately, as more and more software programs or user-created data files are stored on the hard-disk drive, the file-defragmentation process becomes more and more time-consuming, because it also involves relocation of the program files that occupy most of the hard-disk space but are never changed or altered throughout the entire life of their usage.

Another concern of the conventional practice is that a hard-disk drive is subject to nonphysical damages, for instance, such as program files being truncated or cross-linked due to improper assessing or writing during information reproducing or being infected by computer virus. As a result, software programs become corrupted; and, another tedious software installation process is again needed.

A CD-ROM drive, even though becoming increasingly popularly, plays a much less significant role in information processing when compared with a hard-disk drive. This is clearly reflected in the fact that the CD-ROM drive is designed to serve as tertiary storage for providing off-line archives, for distributing software programs to be installed onto a hard-disk drive, and for playing an audio disc. Often, much of the information originally stored on optical discs has to be copied to the hard-disk drive. Eventually, a mass of information is accumulated in the hard-disk drive. At this point, it becomes highly desirable to have a backup drive either a tape backup drive or a removable-disk drive for storing the accumulated mass information. This not only incurs substantial costs to end users but adds up structural bulkiness and power consumption to the computer systems.

In order to remedy the disadvantages and problems mentioned hereinbefore, my U.S. Pat. No. 5,748,575 advances the role of CD-ROM apparatuses in information processing from tertiary storage to secondary storage. This is achieved by providing a CD-ROM-type information processing apparatus having plural turntables for removably accommodating optical discs thereon, plural head units, control means for controlling the independent movements of the head units, signal-process systems for converting multiple sets of information from a compact disc format to the original state of the information, and data transmitting means for simultaneously transmitting multiple sets of converted information to a host computer. The CD-ROM-type information processing apparatus of U.S Pat. No. 5,748,575 enables a computer system to simultaneously and multitaskingly launch several software programs directly from original software discs, thus eliminating tedious and time-consuming software installation, affording a kind of copyright protection to software, and alleviating the burden of a hard-disk drive in information reproduction processing. However, the read-only nature of U.S Pat. No. 5,748,575 disallows any storing of user-created data files, requiring a hard-disk drive for its host computer. The present invention thus makes the optical information processing apparatus of U.S Pat. No. 5,748,575 to become a master drive having not only multiple but highly-improved functions of second and tertiary storage so as to be capable of replacing all of the drives such as hard-disk, floppy-disk, optical-disc, and backup drives that are normally needed in a conventional computer system.

OBJECTS OF THE INVENTION

A first object of the present invention is to provide an information processing apparatus capable of performing not only information reading in multitasking but information writing.

A second object of the present invention is to provide an information processing apparatus having a head unit capable of selectively interacting with at least two optical discs through its driving means, so as to manufacture high-performance information processing apparatus at reduced costs.

A third object of the present invention is to provide an information processing apparatus having plural turntables, plural head units, plural decoding units, at least one encoding unit, and a system control unit so as to afford complete and highly-improved functions of secondary storage and tertiary storage for replacing all of the hard-disk, floppy-disk, optical-disc, and backup drives normally needed in a conventional computer system.

SUMMARY OF THE INVENTION

According to a first preferred embodiment of the present invention, an information processing apparatus comprises plural head units and plural decoding units for multitaskingly performing information reading, and at least one encoding unit for performing information writing with respect to a selected disc surface.

According to a second preferred embodiment of the present invention, an information processing apparatus comprises plural turntables each being rotatable about a respective one of central axes for removably accommodating at least one optical disc, and one head unit capable of positioning its head-means group selectively between the turntables and thus selectively interacting with the optical discs for performing information reading or writing.

According to a third preferred embodiment of the present invention, an information processing apparatus comprises plural turntables each being rotatable about a respective one of central axes for removably accommodating at least one optical disc, plural head units and plural decoding units for multitaskingly performing information reading, at least one encoding unit for performing information writing, and a system control unit for coordinating operation of and for enabling direct communication of the head units, so as to allow said information processing apparatus to possess not only complete but highly-improved functions unobtainable from any combinations of existing hard-disk, floppy-disk, optical-disc, and backup drives that are necessarily equipped in a conventional computer system.

DETAILED DESCRIPTION OF THE PREFERRED EMBODIMENT

Figure 1:
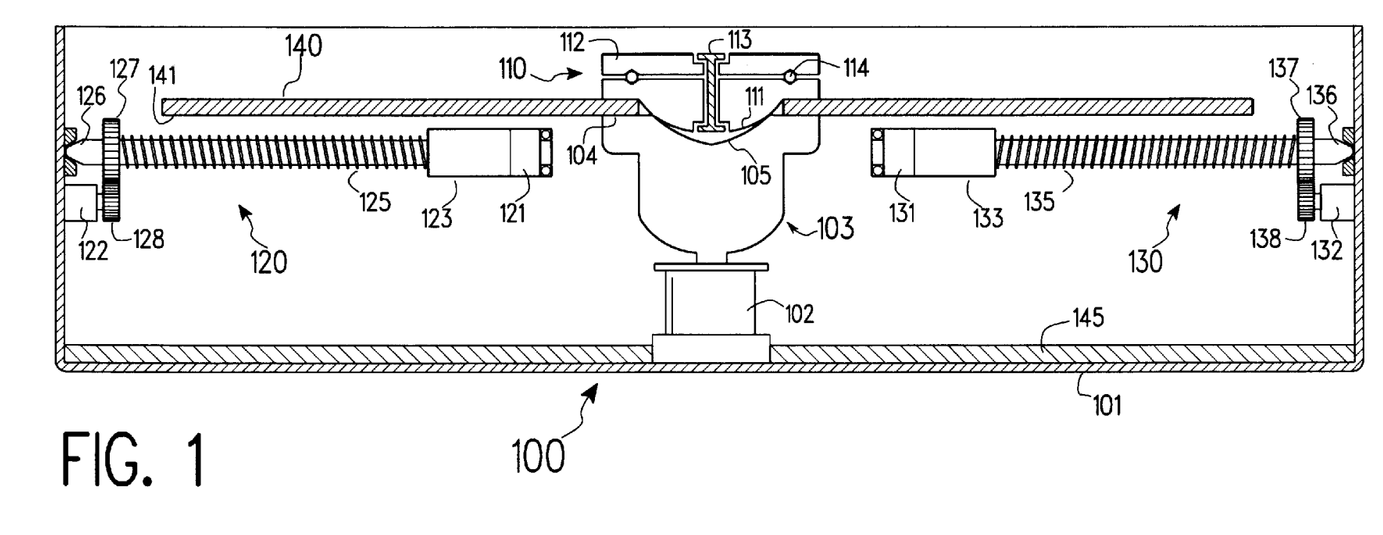
FIG. 1 is a cutaway side view of an information processing apparatus having two head units capable of selectively performing information reading in multitasking and information writing with respect to one disc surface, in accordance with a first preferred embodiment of the present invention.
Figure 2:
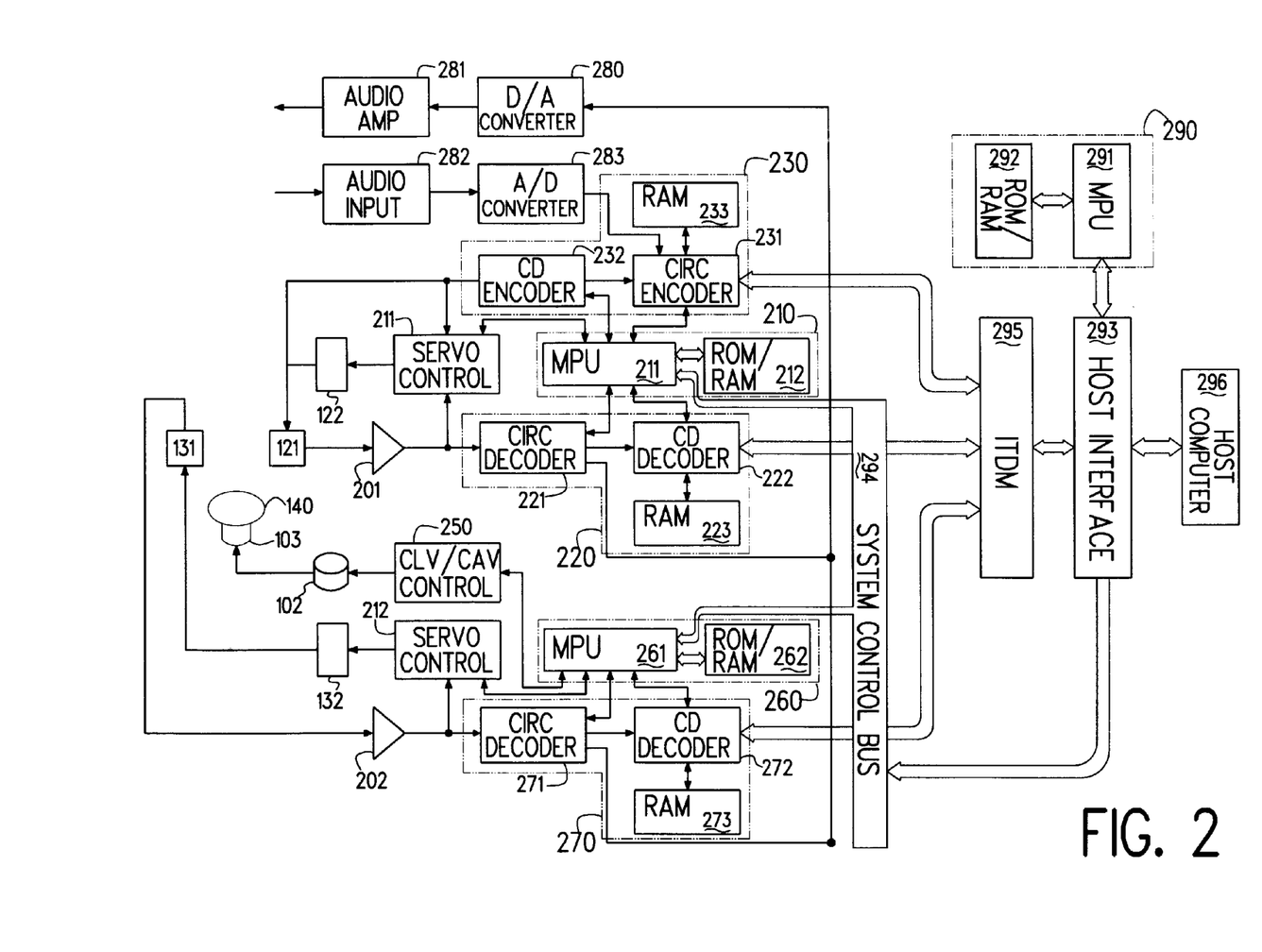
FIG. 2 is a block diagram of a control system of the information processing apparatus shown in FIG. 1.
Figure 3:
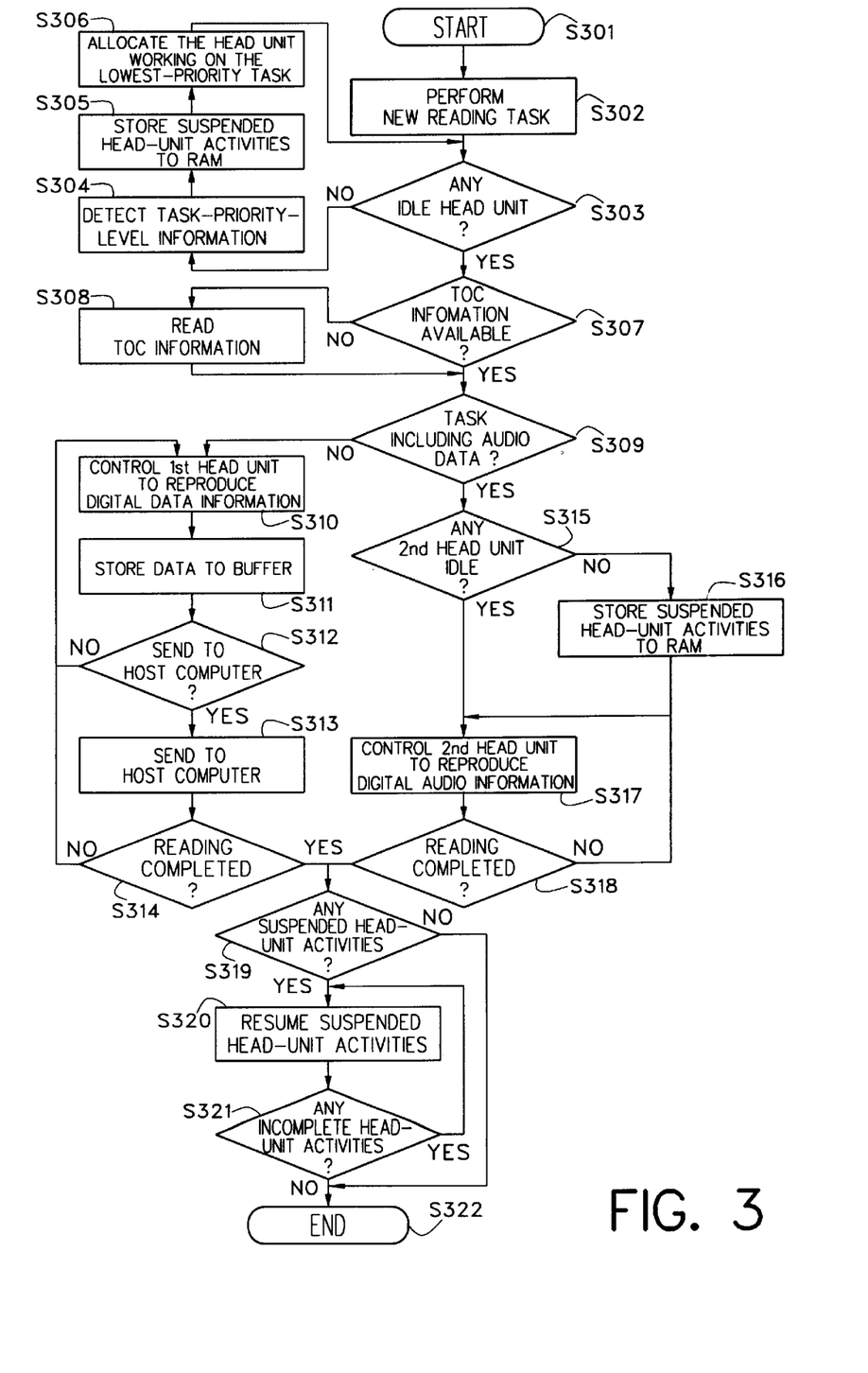
FIG. 3 is a flow chart showing a disc operating system for coordinating operation of the head units to simultaneously process at least two sets of information associated with the same task for improving information-process speed.

Referring now to FIGS. 1–3, a first preferred embodiment of the present invention will be described in detail hereinbelow.

FIG. 1 is a cutaway side view of an information processing apparatus with multitasking capability, having two optical head units and one turntable for detachably mounting one optical disc. Apparatus 100 has a structure 101 on which various mechanism components are disposed. The structure allows the apparatus to be either internally installed as a built-in unit in a computer system or covered by a housing for use as a stand-alone unit to be connected to a host computer. Mounted on structure 101 are an electrical board 145, a turntable motor 102, head units 120 and 130. Turntable motor 102 is provided for rotating a turntable 103 that has a disc-setting surface 104 for accommodating an optical disc 140, and a concave portion 105 for accommodating a convex portion 111 of a disc clamp 110. Disc clamp 110 is movable in up/down directions for respectively releasing/clamping optical disc 140.

Head unit 120 basically comprises an optical head means (i.e., pickup) 121 and a driving motor 122. Driving motor 122 is provided for moving optical head means 121 in a direction perpendicular to the central axis of turntable 103 (or in a radial direction of optical disc 140) through rotating a screw shaft 125. Optical head means 121, provided for reading information from and for writing information onto the lower surface 141 of optical disc 140, is supported by a carrier member 123 having a female screw for engaging with screw shaft 125. Screw shaft 125 has a pivoted end 126 rotatably supported by structure 101 and a gear 127 engaged with a gear 128 on driving motor 122, thus forming a driving mechanism for optical head unit 120. Similarly disposed on the other end of structure 101 is head unit 130 that comprises an optical head means 131, a pivoted end 136, a carrier member 133 with a female screw, a gear 137 on screw shaft 135, a gear 138 on driving motor 132, thus forming a driving mechanism for head unit 130. Upon receiving power and control signals, driving motors 122 and 132 independently and simultaneously move respective optical head means 121 and 131 in a radial direction of optical disc 140 to predetermined positions, so as to multitaskingly interact with the lower surface 141 of optical disc 140.

In order to perform the abovementioned multitasking, turntable motor 102 and thus optical disc 140 are rotated at a constant angular velocity (CAV) method. Even though being reduced to half, the storage capacity of an 120-mm optical disc encoded in the CAV method can still hold a minimum of 250 megabytes of data. Most importantly, the CAV rotation method allows the apparatus of the present invention to rotate at a constant, higher angular velocity for multitaskingly performing high-speed information processing.

FIG. 2 is a block diagram of a control system of the information processing apparatus of FIG. 1. Head units 120 and 130 respectively comprise optical head means 121 and 131, and driving motors 122 and 132. Optical head means 121 and 131 each having elements such as a semiconductor laser diode, objective lens, projection lens, photosensors, λ-4 wave plates, polarizing and beam-splitting prisms, are provided for interacting with optical disc 140. Detailed arrangement of these elements is well known to those skilled in the art of optical storage technology and needs not be repeated here. Optical head means 121 and 131 are respectively interfaced with signal amplifiers 201 and 202, servo controls 211 and 212, local signal-processing systems, and local control units 210 and 260. The local signal-processing system associated with optical head means 121 includes a decoding unit 220 and an encoding unit 230 for proceeding with information reading and writing respectively; while, the local signal-processing system of optical head means 131 includes a decoding unit 270 for information reading only. Local control units 210 and 260 respectively containing MPUs 211 and 261 and ROMs/RAMs (read-only memories and random access memories) 212 and 262 are provided for controlling operation of the respective decoding/encoding units and the respective servo controls in a local level, so as to allow multitasking to take place most effectively.

Signals sensed by optical head means 121 and 131 are very weak and thus respectively amplified by signal amplifiers 201 and 202 to derive usable error signals and high-frequency signals. The derived error signals interface with respective servo controls 211 and 212 for independently controlling the focusing and the radial tracking of optical head means 121 and 131. CLV/CAV control 250 also receives the derived error signals through MPU 261, for selectively controlling the rotation speeds of turntable motor 102 normally at a constant angular velocity (CAV) and at a constant linear velocity (CLV) when either of optical head means 121 and 131 senses CLV-recorded information from optical disc 140. The high-frequency signals from each of signal amplifiers 201 and 202 are in a compact disc format or specifically in the EFM (eight-to-fourteen modulation) format and thus need to be processed by decoding units 220 and 270 respectively comprising CIRC (Cross Interleaved Reed-Solomon Code) decoders 221 and 271, CD decoders 222 and 272, and RAM (random access memory) 223 and 273 in order for the signals to be deinterleaved, demodulated, and decoded for error-correction process, restoring the original sequence of data symbols, and finally converting the 14-bit word back to the original 8-bit data symbols. RAMs 223 and 273 are used in temporarily storing data to be reassembled during the proceeding of the signal processing.

Included in encoding unit 230 are a CIRC encoder 231, a CD encoder 232, and a RAM 233 for encoding a set of information to be stored onto optical disc 140 through optical head means 121. During information writing, a semiconductor laser diode (not shown) contained in optical head means 121 is controlled by local control unit 210 to emit a laser beam at increased output power. Also provided in FIG. 2 are a digital-to-analog converter (D/A Converter) 280 and audio amplifier 281 for sound reproducing, and an audio input 282 and an analog-to-digital converter (A/D Converter) 283 for sound recording.

Local control units 210 and 260 are interfaced by a system control unit 290 containing MPU 291 and ROM/RAM 292 through wide-band host interface 293 and system control bus 294. The read-only memory portion of ROM/RAM 292 contains basic instructions needed for MPU 291 to issue control signals to MPUs 211 and 261 for coordinating operation of head units 120 and 130. ITDM (intelligent time-division multiplexer) 295 and other wide-band buses are provided in order for plural sets of data decoded by decoding units 220 and 270 to be simultaneously transmitted to a host computer 296.

Optical disc 140 may contain information in a digital data format and in a digital audio format needed for running multimedia applications. The table of contents for such a mixed disc uses the digital audio format. Information in the digital data format can be binary programs, ASCII text, graphics, and video images, which are basically associated with producing visual images. The digital data information is stored on data tracks in a sector or block structure including sync, header, data, and/or auxiliary EDC/ECC (error correction and detection) fields. Digital audio data information, however, is read as frames and has to be stored on audio tracks separated from the data tracks. A pre-gap and/or post-gap containing no data is provided to serve as a transition between a data track and an audio track. Under these circumstances, it is difficult for a conventional CD-ROM drive having only one head unit to simultaneously reproduce both the digital data information and the digital audio information in a real time mode, such as playing full-screen, full-motion pictures (requiring 30 frames per second). To the contrary, this can be easily achieved by information processing apparatus 100 of the present invention when a set of instructions are provided for coordinating head units 120 and 130 to perform such a task.

Accordingly, provided in the present invention is a flow chart, FIG. 3, of a disc operating system for coordinating the head units to simultaneously process two sets of information associated with the same reading task of a software program for increasing information-process speed. Note that "S" stands for "Step" hereinafter. When receiving a request signal from host computer 296 for performing a new reading task (S301 and S302), MPU 291 (shown in FIG. 2) determines if there is any idle head unit allocable to the new reading task (S303). If not, MPU 291 interfaces with MPUs 211 and 261 for detecting task-priority-level information (S304) and the activities of head units 120 and 130 to be suspended are stored to the RAM portion of ROM/RAM 292 (S305), and for making the head unit working on the lowest-priority task available as the first head unit to the new reading task (S306). MPU 291 further checks if the RAM portion of ROM/RAM 292 contains the TOC (table of contents) information of optical disc 140 (S307) associated with the new reading task. If not, the first head unit is then instructed to read the TOC information, which is located in the lead-in area of optical disc 140, for obtaining address information associated with the new reading task (S308). The TOC information may include locations of digital data information and digital audio information. S309 determines if the new reading task involves reading of digital audio information. When the new reading task does not involve the reading of digital audio information, the first head unit is controlled to read digital data information for the reproduction of the binary program associated with the new reading task, so as to execute the software program and to produce visual images. The digital data information is decoded and temporarily stored in RAM 223 or RAM 273 served as a buffer (S311). S312 determines if host computer 296 is ready for accepting the data temporarily stored in the respective buffer. After the digital data information is sent to host computer 296 (S313), S314 determines if the reading of the digital data information is completed or not. When there involves reading digital audio information (S309), a second head unit is then made available by suspending, if necessary, the activity of the second head unit for reproducing the digital audio information (S315–S317). If both reading digital audio information (S318) and reading digital data information (S314) are completed, head units 120 and 130 are instructed to resume their suspended R/W activities if any (S320). When there is no suspended R/W activity (S319) or the suspended R/W activities are completed (S321), the activities of both head units 120 and 130 are accordingly ended (S322).

In essence, the information processing apparatus comprises a control system unit having microprocessor means and ROM comprising basic instructions for coordinating operation of these head units to simultaneously process at least two sets of information associated selectively with the same task for increasing information-process speed and with different tasks for achieving true multitasking.

Figure 4:
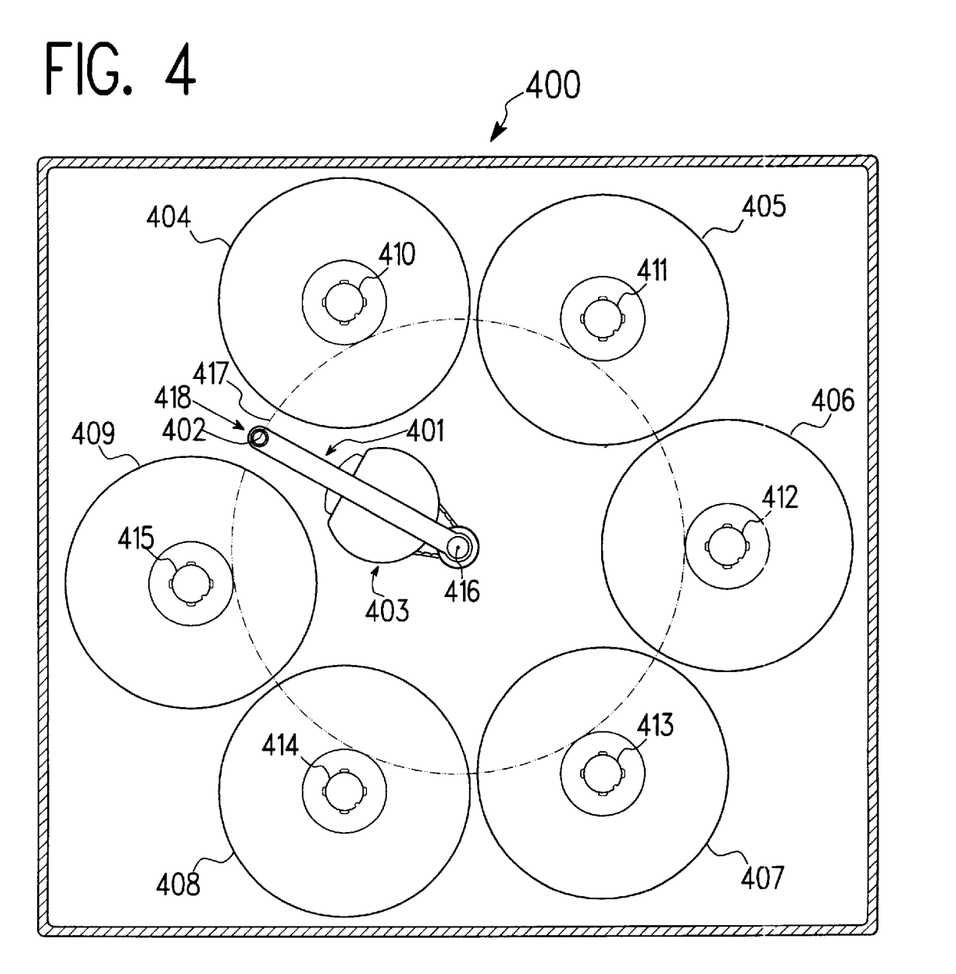
FIG. 4 is a top view of an information processing apparatus having one head unit movable selectively between plural turntables, in accordance with a second preferred embodiment of the present invention.
Figure 5:
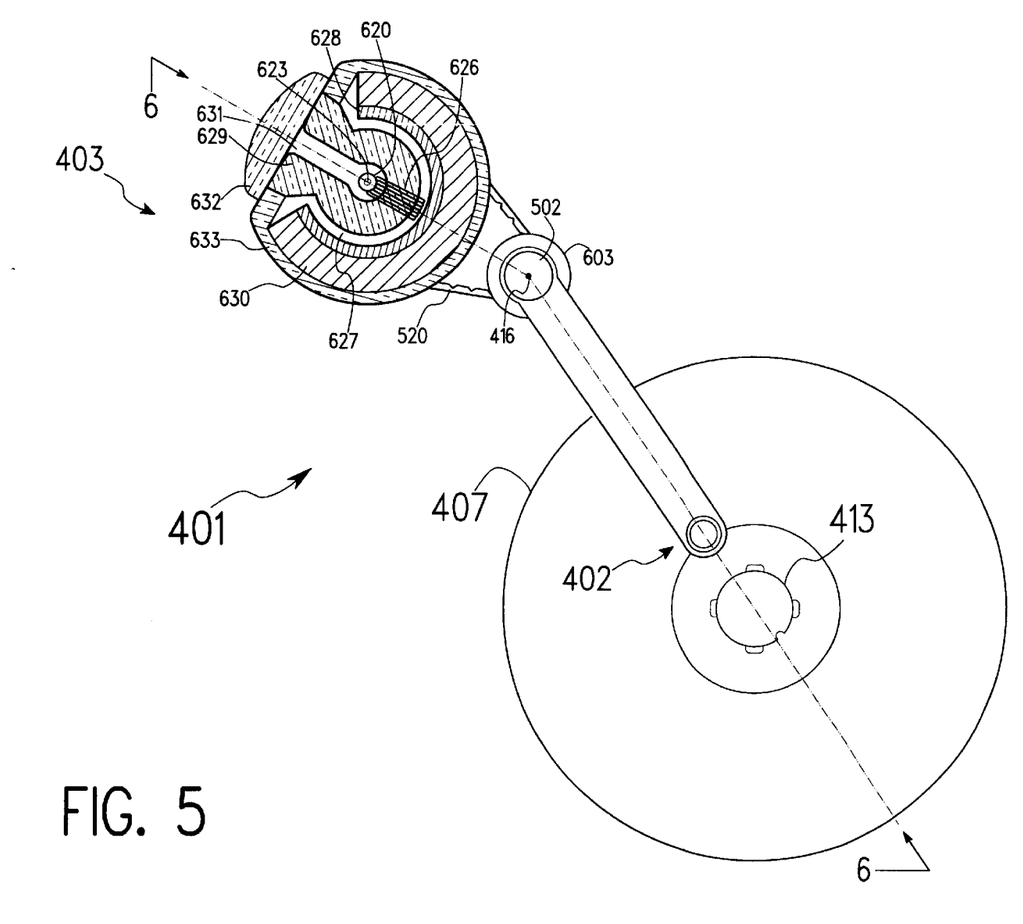
FIG. 5 is an illustrative top view of a head unit and a turntable of FIG. 4, showing a driving means in a cutaway top view and a head-means group in a plan view.
Figure 6:
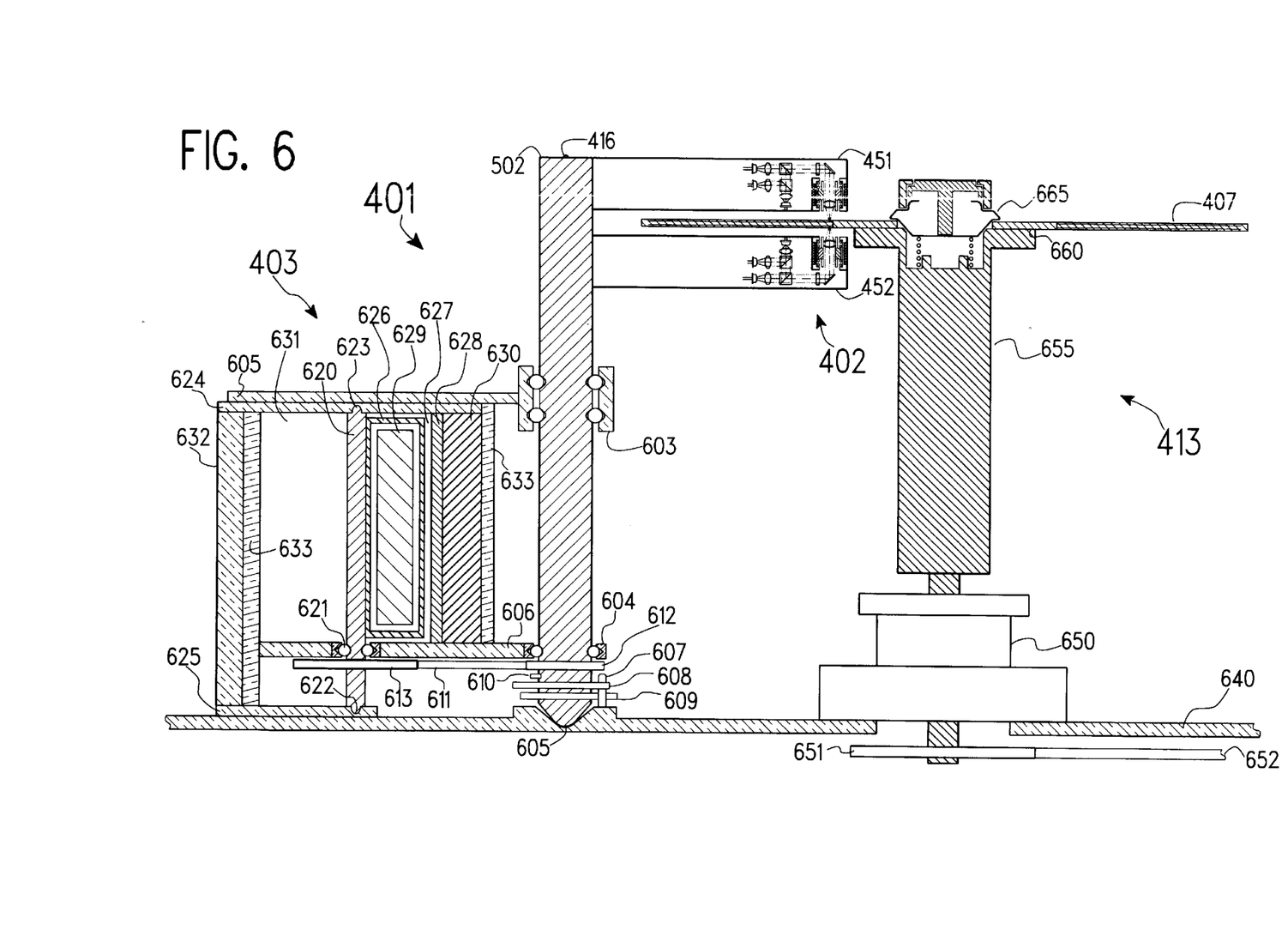
FIG. 6 is a cutaway side view of the head unit and the turntable along the line 6—6 of FIG. 5.

Referring now to FIGS. 4–6, a second preferred embodiment of the present invention will be described in detail hereinbelow.

FIG. 4 is a perspective, top view of an information processing apparatus 400 having an optical head unit 401 comprising an optical head-means group 402 and a driving means (or swing mechanism) 403. Driving means 403 is provided for moving optical head-means group 402 to travel through swinging about axis 416 to any disc positions selectively on discs 404–409 that are disposed on respective disc-setting surfaces of turntables 410–415 each being rotatable about a separate one of central axes. Each of the discs has a diameter of 45 mm. The disc-setting surfaces and thus the discs are horizontally aligned with each other and are concentrically disposed at predetermined positions such that the centers of these discs are at an equal distance from axis 416. Underneath turntable 407 is a turntable motor 650 (shown in FIG. 6) for driving turntables 410–415 simultaneously. Each of turntables 410–415 comprises its own disc-loading and releasing means. Thus, without going through other intermediate loading stages (such as internal disc changing or disc selecting used in the prior arts), information reading/writing can be immediately proceeded simply through swinging head-means group 402 about axis 416 to a disc selectively between discs 404–409.

Driving means 403 enables optical head unit 401 to perform a maximum of 350° swing about axis 416, starting from position 418, for accessing any disc positions on discs 404–409. Specifically, head-means group 402 of optical head unit 401 travels in accordance with the phantom circular line 417; thus, any information stored on these discs becomes readily accessible. Because of being designed for discs with smaller sizes and being equipped with a single turntable motor and an optical head unit 401 capable of travelling among discs 404–409, information processing apparatus 400 can be economically produced in a size similar to the commercially available single 120-mm-disc player, installable into the interior of a personal computer.

Discs 404–409 shown in FIG. 4 are arranged in a manner that there is an open space between disc 404 and disc 409 for optical head unit 401 to park at position 418. This open space allows head-means group 402 to contain an upper optical head means 451 and a lower optical head means 452 (shown in FIG. 6) without interfering with the loading/unloading of discs 404 and 409. Objective lenses of optical head means 451 and 452 (FIG. 6) are disposed in a direction facing to each other, so as to allow both surfaces of a selected one of discs 404–409 to be simultaneously accessed. Use of two optical read heads of this type provides twofold advantages: doubling not only the information storage capacity of a disc but the speed of information processing.

FIG. 5 is an enlarged perspective top view of optical head unit 401 with head-means group 402 moved to the lead-in area or the innermost disc position of disc 407 mounted on turntable 413, for illustrating that a single driving means 403 is used to horizontally move optical head-means group 402 selectively between various disc positions as well as between a plurality of discs for information reading/writing in accordance with the present embodiment. The cutaway side view along the line of 6—6 of FIG. 5 is shown in FIG. 6. Optical head-means group 402 supported by a shaft 502 is swingable about axis 416. The swing motion of optical head-means group 402 is powered by driving means 403 through a toothed belt 520.

Turntable 413 seen in FIG. 6 has a turntable shaft 655 which is rotatably connected to the upper shaft of turntable motor 650 fastened to a frame 640. At the top portion of turntable shaft 655 are a disc-setting table surface 660 and disc clamp means 665 retractable into turntable shaft 655 for clamping/releasing disc 407. At the other portion of the shaft of motor 650 is a pulley 651 connected by a toothed belt 652 for transmitting rotation power from turntable motor 650 to other turntables seen in FIG. 4. Accordingly, a plurality of turntables can be driven by a single turntable motor. This reduces construction costs and space for commercializing the optical information processing apparatus of the present invention.

Shaft 502 is rotatably supported by bearings 603 and 604 and has a pivoted end 605 for its swinging. Bearings 603 and 604 are respectively supported by top and bottom supporting frames 605 and 606 fixedly attached to driving means 403. A stop pin 607 fixedly attached to frame 640 and two helical tension springs 608 and 609 arranged in opposite direction are provided in order to produce torque restrain for a steady swing of shaft 502 about its axis 416. A stop pin 610 fixedly attached to the bottom portion of shaft 502 is provided for resting shaft 502 at a reference position. A toothed belt 611 connects a pulley 612 on shaft 502 and a pulley 613 on a moving-coil shaft 620 for transmitting rotation power. Pulley 613 has a diameter larger than pulley 612 so that driving means 403 can provide a maximal swing angle of 350° This allows optical head-means group 402 to travel rapidly not only between disc positions of a selected disc but between discs 404–409, because the travelling involves only one single-directional movement.

Supported by bearings 621, moving-coil shaft 620 has top and bottom pivots 622 and 623 that are respectively held in place by top and bottom frames 624 and 625 for its swing. One end of moving coil 626 is fixedly attached to moving-coil shaft 620, the other end is allowed to freely travel in the uniform air gap 627 defined by an outer soft-iron pole piece 628 and an inner pole piece 629. Bonded to outer soft-iron pole piece 628 is a magnet 630. An air gap 631 extending to the inner area of a covering frame 632 is provided in order for moving-coil shaft 620 with attached moving coil 626 to be assembled into the configuration of FIG. 5 and also allows moving-coil shaft 620 and the fixedly attached end of moving coil 626 to rotate about the axis defined by pivots 622 and 623. Attached to the outer circular area of magnet 630 is a laminated steel shell 633 that acts as a magnetic collector ring and also effectively shields the element from stray fields.

Figure 7:
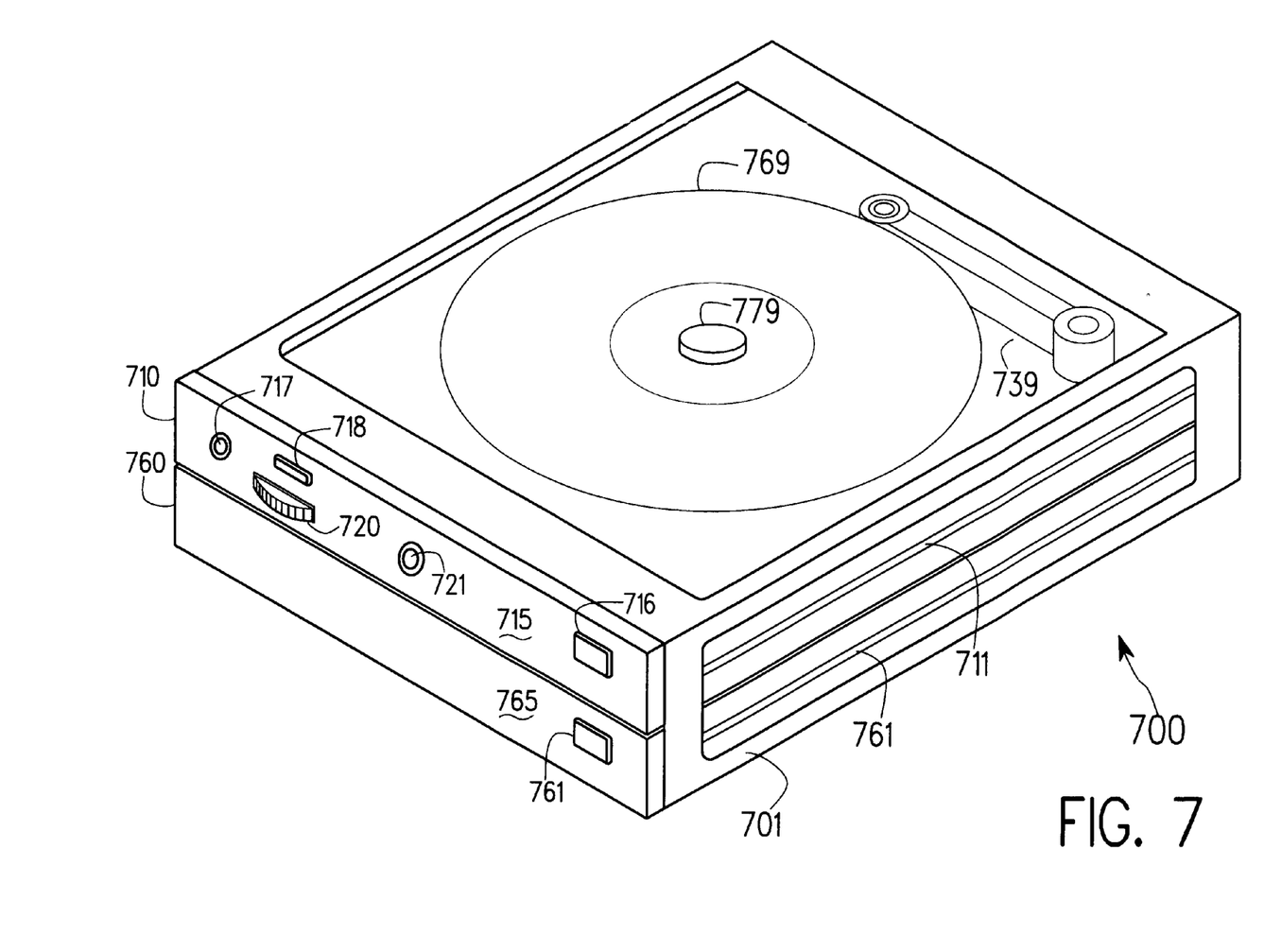
FIG. 7 is a perspective view of an information processing apparatus in a disc-loaded position, in accordance with a third preferred embodiment of the present invention.
Figure 8:
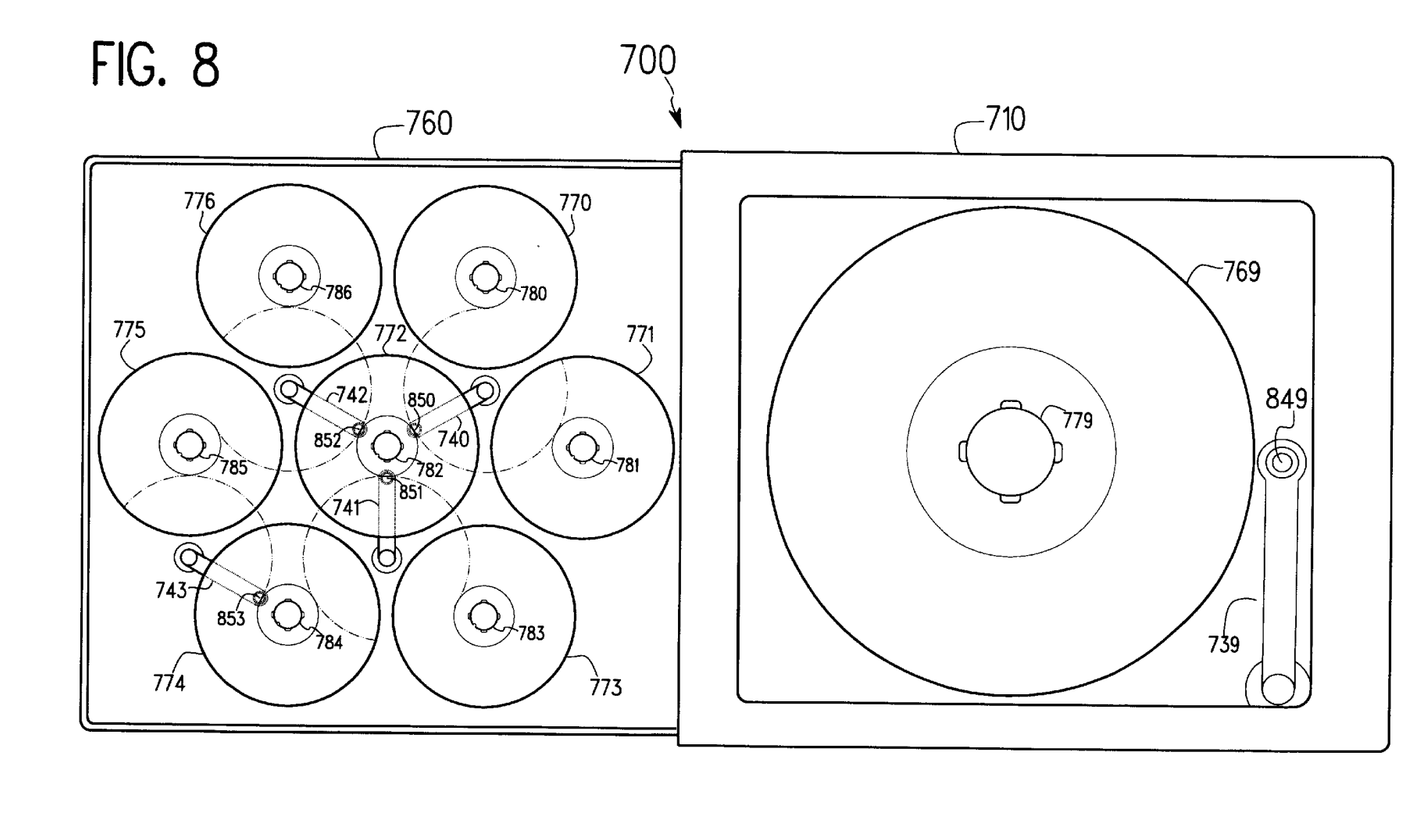
FIG. 8 is an illustrative top view of the information processing apparatus seen in FIG. 7, showing five optical head units and eight turntables mounted with discs thereon.
Figure 9:
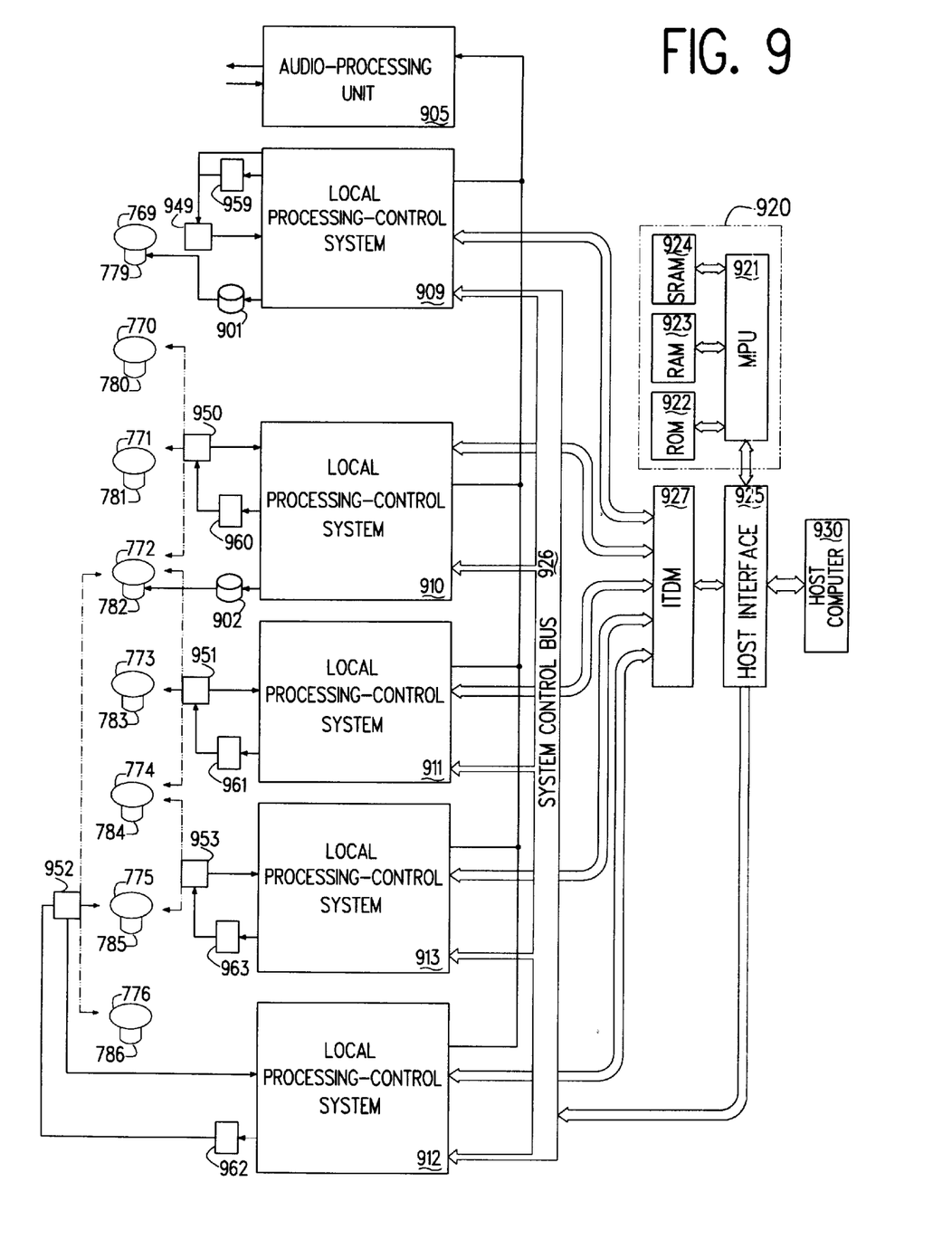
FIG. 9 is a simplified block diagram of a control system of the information processing apparatus shown in FIG. 8.

Referring now to FIGS. 7–9, a third preferred embodiment of the present invention will be described in detail hereinbelow.

FIG. 7 is a perspective top, side view of an information processing apparatus 700, having an upper compartment 710 and a lower compartments 760 both currently being in a disc-loaded position. FIG. 8 is a perspective top view of information processing apparatus 700 showing lower compartment 760 extended to a disc loading/unloading position. Compartment transporting means 711 and 761 are provided for making compartments 710 and 760 retractable into (i.e., in a disc-loaded position) and out of (i.e., in a disc-loading/unloading positions) structure 701. On the front panel 715 of upper compartment 710, there are a push-type button 716 for the open/close operation of upper compartment 710, an audio output connector 717 for sound output, a play button 718 for playing a digital audio disc, and a volume control 720 for adjusting sound level. Also equipped in information processing apparatus 700 is a lockout device 721 for locking both compartments 710 and 760 with respect to structure 701 for safeguarding the optical discs stored therein from being unauthorizedly removed. Lockout device 721 is responsive to a mechanical key and to an electrical signal issued by a host computer, allowing the open/close operation of compartments 710 and 760 controllable by the signal generated from the keyboard of a host computer (not shown).

Situated in upper compartment 710 are one 120-mm disc 769 horizontally disposed on turntable 779 and one head unit 739 having a head-means group 849 (FIG. 8) swingable to a predetermined disc position in a direction perpendicular to the central axis of turntable 779 (or in a radial direction of disc 769). Preferably, a disc with audio or multimedia information will be played in this compartment.

Horizontally disposed in lower compartment 760 are seven 45-mm-diameter discs 770–776 stored on respective disc-setting surfaces of turntables 780–786 and four head units 740–743 respectively comprising head-means groups 850–853. Preferably, lower compartment 760 serves as secondary storage for launching software programs directly therefrom and for storing user-created data files and/or software-generated data files. The software-generated data files refer to as the data information such as hardware setting parameters and other data files not related to the program files that are stored on a disc for distribution. Turntables 780–786 and thus their respective disc-setting surfaces, each being rotatable about a separate one of central axes, are arranged in such a manner that discs 770–776 mounted thereon are horizontally aligned with each other. Head-means groups 850–853 are also aligned to the best extent, forming a horizontal travelling plane (consisting of the phantom circular lines) underneath perpendicular to the central axes of turntables 780–786 (or parallel to the disc-surface plane) for facilitating their focusing during interacting with the lower surfaces of discs 770–776. As illustrated by the phantom circular lines, head-means group 850–853 are able to travel selectively between discs 770–772, between discs 772–774, between discs 772, 775 and 776, and between discs 774 and 775, respectively. Information stored on the 45-mm discs is preferably in the CAV scheme, in order for head units 740–743 to perform high-speed, multitasking information processing. A single side of a 45-mm disc of this type is capable of holding a minimum of 60 megabytes of data, sufficient for storing a package of application software programs such as Microsoft Office® containing Microsoft Word® Version 6.0a (about 17 megabytes), Microsoft Excel® Version 5.0 (about 17 megabytes), and Microsoft PowerPoint® Version 4.0 (about 18 megabytes). Use of a 45-mm disc or other small-sized discs is also more realistic than that of an 120-mm disc because software developers such as Microsoft®,IBM®, WordPerfect®, or Lotus® are most likely to produce their own software discs but each of their system or application software programs is not big enough to even fill up 15% of an 120-mm disc capacity. This also gives a user flexibility to choose a preferred program, for instance, a word processing program between WordPerfect®(about 28 megabytes) and Microsoft Word® since both are unlikely to be stored on the same disc.

Disc 772, capable of being simultaneously interacted by three head units 740–742, preferably contains a package of application software programs including, for instance, Microsoft Word®, Excel®, and PowerPoint®. Turntable 784 accessible by head units 741 and 743 is an ideal location for storing a Microsoft Windows® 95 or IBM OS/2® disc containing a disk operating system (DOS) and other shared programs. Discs 775 and 776 may contain erasable/rewritable media for storing data files created by a user or generated by a software program; and, head units 742 and 743 are capable of selectively performing information reading and information writing. While running system and/or application software programs from discs situated in lower compartment 760, a user can enjoy digital music by playing an audio disc situated in upper compartment 710. The individual open/close operation capability of upper compartment 710 and lower compartment 760 further allows the user to change a music disc, when needed, without interrupting his/her active sprograms performed in lower compartment 760, and vice versa.

Owing to the high-speed and multitasking nature of information processing apparatus 700 of the present embodiment, it becomes possible to launch or execute software programs directly from original software discs. This eliminates the conventional, tedious and time-consuming software installation procedure in which a software program stored on a plurality of floppy diskettes or an optical disc has to be (decompressedly) copied to a hard-disk drive from where the software program is then launched.

A simplified block diagram of a control system of information processing apparatus 700 is shown in FIG. 9. Head units 739–743 respectively contain optical head means 949–953, and driving means 959–963 that are respectively interacted by local processing-control systems 909–913. Each of local processing-control systems 909–913 contains a local control unit (each having a MPU and a ROM/RAM), and a decoding unit. Local processing-control systems 912 and 913 each additionally comprises an encoding unit for performing information writing. Each of the local control units controls operation of a respective one of the head units, a respective one of the decoding/encoding units, and a respective one of the servo controls in a local level, so as to allow multitasking to take place most effectively. Conversion of audio data between analog and digital formats is performed by an audio-processing unit 905. Turntable motors 901 and 902 rotate respective turntables 779 and 780–786 either at a CLV scheme or at a CAV scheme. A system control unit 920, comprising MPU a 921, a ROM 922, a RAM 923, and a SRAM (static randomaccess memory) 924, is connected to each of the local processing-control systems 909–913 for interacting with a host computer 930 and for coordinating the local operations of the local control units contained in local processing-control systems 909–913 through wide-band host interface 925 and system control bus 926. In essence, system control unit 920 coordinates operation of head units 740–743 in interacting with discs 770–776 so as to allow selected two of head units 740–743 to simultaneously process two sets of information associated selectively with the same task for improving information-process speed and with different tasks for achieving true multitasking. ROM 922 contains basic instructions needed for MPU 921 to issue control signals to the local control units contained in local processing-control systems 909–913; and, RAM 924 is provided for temporarily storing information such as the suspended activities of head units 739–743 during information processing. SRAM 924 is afforded for storing basic information such as the read-only or erasable/rewritable nature of discs 769–776 and directory-structure information or path tables of discs 769–776, allowing information processing apparatus 700 to instantly determine the very disc with which a new task is to be proceeded. This also eliminates the step of requesting each head unit to read the TOC information of each respective disc, when host computer 930 is booted. Thus, any new reading/writing task can be instantly executed. Other bootstrap data affecting the booting of host computer 930, such as a user-defined file of autoexec.bat, is also preferably stored and updated on SRAM 924 for high-speed performance, although it can be stored on disc 775. Thus, host computer 930 can be booted in no time. ROM 922 further contains instructions to request the information contained in SRAM 924 to be verified or updated before the shutdown of information processing apparatus 700. Thus, the basic information contained in SRAM 924 always remain updated so as to ensure that any information-writing or information-reading request can be launched instantly. Use of the SRAM eliminates the need to refresh the contents of the information/instructions many times a second; thus, the information/instructions can be retained through power of a battery. ITDM 927 and other wide-band buses are provided for simultaneously transmitting a plurality of sets of data generated from local processing-control systems 909–913 to host computer 930.

In accordance with the present invention, none of the program files stored on read-only discs 770–774 shall be copied to erasable/rewritable disc 775 or 776. This essentially eliminates a tedious, time-consuming software-installation process; therefore no operating burden will be added to head unit 742 or 743. Information reading and information writing thus can be proceeded in a high-speed, multitasking manner. Preferably, a software program is written in a manner capable of communicating with the basic information stored in SRAM 924 so that a user is automatically prompted to set up a directory for storing user-created and/or software-generated data files on disc 775 or 776, if the directory for storing user-created and/or software-generated data files is not yet created.

Because user-created data files and/or software-generated data files are stored on erasable/rewritable discs 775 and 776 separated from program files stored on read-only discs 770–774, no tedious, time-consuming file-defragmentation process will ever be needed. With the coexistence of system control unit 920 and the local control units, information exchanging or direct communication between the head units and thus between the discs separately mounted thereon can be established. For example, through head units 742 and 743, files can be copied directly from erasable/rewritable disc 775 to erasable/rewritable disc 776 for making off-line archives without involving or going through host computer 930. Such direct interfacing/communication is not available in conventional computer systems between a hard-disk drive and a floppy-disk drive, or other removable disk drive. The separation of user-created and/or software-generated data files from program files limits the amount of the data files that need to be transported or secured. In conventional practice, the feature of allowing a selected one of discs removable is only achievable when several information-storage drives such as a hard-disk drive and a removable-disk drive are combined, but at the expense of incurring additional costs and hardware bulkiness. Accordingly, information processing apparatus 700 not only possesses complete functions of a hard-disk drive, a floppy-disk drive, an optical-disc drive, and a backup drive that are normally needed in conventional practice, but provides highly-improved functions of secondary storage and tertiary storage that are not achievable by any combinations of the conventional information-storage derives.

Figure 10:
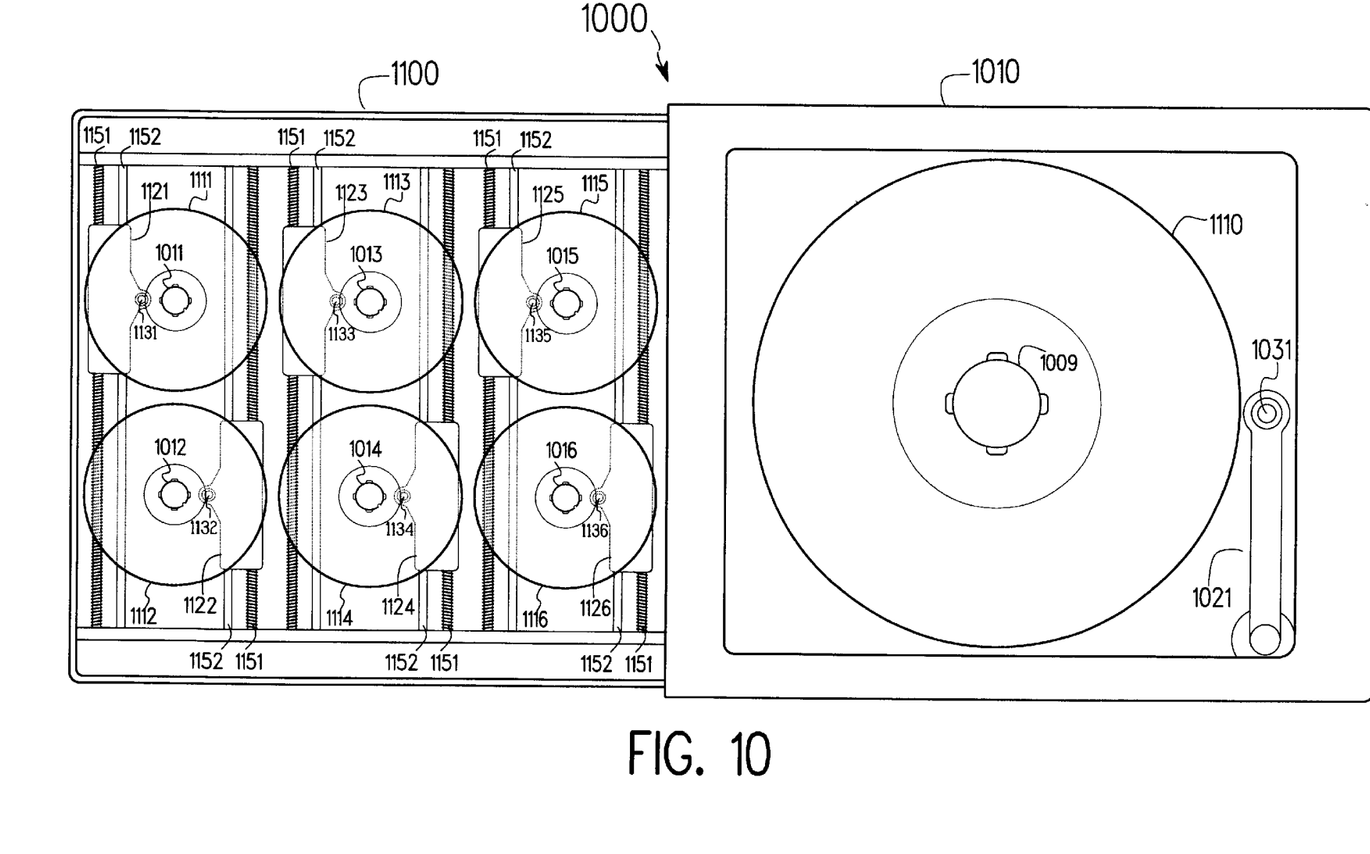
FIG. 10 is an alternative configuration of plural turntables and plural head units.

Shown in FIG. 10 is an information processing apparatus 1000 with an alternative configuration of turntables and head units, having a compartment 1100 different from compartment 760 shown in FIG. 8. Compartment 1010 of FIG. 10 contains a turntable 1009 mounted with a disc 1110 and a head unit 1021 having an optical head means 1031; while, compartment 1100 contains turntables 1011 and 1012 respectively mounted with magneto-optical discs 1111 and 1112, four turntables 1013–1016 respectively bearing read-only discs 1113–1116, and six head units 1121–1126. Magneto-optical discs 1111 and 1112 contain magnetically-sensitive, metallic crystals whose orientations are re-alignable only when exposed to an intense laser beam and magnetic impulse, thus being erasable/rewritable. Each of head units 1121–1126 is capable of linearly moving along a respective screw shaft 1151 and a respective sliding rail 1152 by a predetermined distance in a radial direction of a respective one of the discs (or in a direction perpendicular to a respect one of central axes of turntables 1011–1016) so as to position each respective one of optical head means 1131–1136 at a predetermined disc position for performing information processing. Head units 1121 and 1122, each further comprising means for generating magnetic impulses, are able to selectively perform information reading and writing. Discs 1111 and 1112, discs 1113 and 1114, and discs 1115 and 1116 are respectively aligned with each other. Thus, each of discs 1111–1116 can be either interacted either by one optical head means or by two optical head means simultaneously for achieving high-speed, high-performance information processing.

While FIGS. 8 and 9 show a configuration in which head-means groups 850–853 each contains a respective one of optical head means 950–953 for interacting with the lower surface of a respective one of discs 770–776, it is possible that some of the head-means groups 850–853 each contains two optical head means for interacting simultaneously with both surfaces of a selected disc. Configurations other than FIGS. 8–10 are also possible; similarly, a turntable of the present invention can also be rendered detachable for mounting a disc-pack cartridge consisting of plural erasable/rewritable discs and a head-means group can be made to have plural head means each interacting with a respective disc surface of the plural erasable/rewritable discs so as to store a mass of data. Thus, the preferred embodiments of the present invention mentioned hereinabove are provided by way of example only. Numerous variations, changes, modification, and substitutions will occur to those skilled in the art without departing from the invention herein. Accordingly, it is intended that the invention be limited only by the spirit and scope of the appended claims.

What is claimed is:

1. An information processing apparatus comprising:
   (a) a structure;
   (b) a plurality of turntables disposed within said structure, each of said turntables being rotatable about a respective one of central axes and having means for mounting at least one disc thereon;
   (c) a head unit having a driving means and a head-means group, said driving means being provided for moving said head-means group in a direction perpendicular to said central axes, wherein said head-means group comprises at least one optical head means each for interacting with a disc surface;
   (d) at least one decoding unit, each being provided for decoding a set of encoded information retrieved by one of said optical head means;
   (e) at least one encoding unit, each being provided for encoding a set of information to be stored; and
   (f) means for controlling said driving means to move said head-means group selectively between said turntables; whereby said turntables and said head unit are adapted in such a manner as to allow said head-means group to travel selectively between said turntables and thus between corresponding discs mounted thereon.

2. The information processing apparatus of claim 1 further comprising writable memory-storing means for storing information comprising bootstrap data, table of contents data, volume table of contents data, and directory-structure data of corresponding discs mounted on said turntables.

3. The information processing apparatus of claim 1 further comprising means for enabling at least one of said turntables each to be detachable for mounting said at least one disc on said means for mounting.

4. An information processing apparatus comprising:
   (a) a structure;
   (b) a plurality of turntables disposed within said structure, said turntables each being rotatable about a respective one of central axes and having means for mounting at least one disc thereon;
   (c) a plurality of head units each having a driving means and a head-means group, each of said driving means being provided for moving a respective one of said head-means groups in a direction perpendicular to at least one of said central axes, wherein each of said head-means groups comprises at least one optical head means each for interacting with a disc surface;
   (d) at least one decoding unit each being provided for decoding a set of encoded information retrieved by one of said optical head means;
   (e) at least one encoding unit, each being provided for encoding a set of information to be stored; and
   (f) means for simultaneously controlling said plurality of head units, said at least one decoding unit and said at least one encoding unit to process information in multitasking.

5. The information processing apparatus of claim 4 further comprising means for simultaneously transmitting at least two sets of information between said information-storage apparatus and a host computer.

6. The information processing apparatus of claim 4, wherein said turntables and said head units are adapted in such a manner as to allow at least one of said head units each to move a respective head-means group selectively between at least two of said turntables and thus corresponding discs mounted thereon.

7. The information processing apparatus of claim 4, wherein said turntables and said head units are adapted in such a manner as to allow at least one of said turntables each to be accessible simultaneously by at least two of said head units, such that said information processing apparatus can utilize at least two head means to interact simultaneously with a selected disc surface for processing at least two sets of information associated selectively with the same task for improving information-process speed and with different tasks for achieving true multitasking.

8. The information processing apparatus of claim 4, wherein said means for simultaneously controlling comprises local control units each for controlling a respective one of said head units to perform information processing in a local manner and a system control unit for coordinating operation of said local control units to simultaneously process said at least two sets of information.

9. The information processing apparatus of claim 4 further comprising local control units each for controlling a respective one of said head units to perform information processing in a local manner and a system control unit connecting to at least two of said local units for enabling and controlling direct communication between at least two of said head units, so as to allow information to be sent directly from a first one to a second one of said at least two head units without going through a host computer.

10. The information processing apparatus of claim 4 further comprising a system control unit for coordinating operation of said head units to simultaneously process at least two sets of information associated selectively with the same task for improving information-process speed and with different tasks for achieving true multitasking.

11. The information processing apparatus of claim 10, wherein said system control unit further comprises microprocessor means, read-only-memory means, and writable memory-storing means.

12. The information processing apparatus of claim 11, wherein said read-only-memory means further comprises a set of basic instructions for coordinating operation of said head units in preforming a new reading task with respect to a selected disc surface, said set of basic instructions including:
   (a) detecting task-priority-level information of said head units;
   (b) allocating a first head unit having the lowest-priority level in accordance with said task-priority-level information to said new reading task;
   (c) requesting said first head unit to read table of contents information of said selected disc for obtaining address information associated with said new reading task, if said address information being not available;
   (d) if said address information including digital audio information, allocating a second head unit having the second lowest-priority level in accordance with said task-priority-level information to said new reading task for reading said digital audio information;
   (e) storing suspended activities of said first and said second head units, if any, to said writable memory-storing means; and
   (f) resuming said suspended activities, if any, when said new task being accomplished.

13. The information processing apparatus of claim 4 further comprising writable memory-storing means for storing information comprising bootstrap data, table of contents data, volume table of contents data, and directory-structure data of corresponding discs mounted on said turntables.

14. The information processing apparatus of claim 4 further comprising means for enabling at least one of said turntables each to be detachable for mounting said at least one disc on said means for mounting.

15. The information processing apparatus of claim 4 further comprising read-only-memory means containing a set of instructions for designating at least a predetermined one of said turntables each to be mounted with at least one disc containing selectively erasable and rewritable media for storing information thereon.

\* \* \* \* \*